United States Patent [19]

Adachi

[11] 4,123,117
[45] Oct. 31, 1978

[54] HYDRAULIC ROOSTING MEANS

[75] Inventor: Yoshiharu Adachi, Toyota, Japan

[73] Assignee: Aisin Seiki Kabushiki Kaisha, Kariya, Japan

[21] Appl. No.: 845,308

[22] Filed: Oct. 25, 1977

Related U.S. Application Data

[63] Continuation of Ser. No. 572,390, Apr. 28, 1975, abandoned.

[30] Foreign Application Priority Data

May 4, 1974 [JP] Japan .................................. 49-50427
May 7, 1974 [JP] Japan .................................. 49-49686

[51] Int. Cl.² ............................................. B60T 13/12
[52] U.S. Cl. ..................................... 303/114; 60/548; 60/553
[58] Field of Search ................. 60/547, 548, 550, 553; 91/47, 370, 371, 372, 391 R, 391 A, 460; 303/114

[56] References Cited

U.S. PATENT DOCUMENTS

| | | | |
|---|---|---|---|
| 2,802,456 | 8/1957 | Lance | 91/47 |
| 3,729,235 | 4/1973 | Bach | 303/21 F |
| 3,898,809 | 8/1975 | Baker | 60/548 |

Primary Examiner—Martin P. Schwadron
Assistant Examiner—Abraham Hershkovitz
Attorney, Agent, or Firm—Finnegan, Henderson, Farabow & Garrett

[57] ABSTRACT

This invention relates to hydraulic boosting means which requires only small operation stroke of an input member when it is brought into an operative condition and only limited amount of hydraulic fluid is passed from hydraulic power source through booster control valve means when the boosting means is in inoperative condition, the remaining portion of the hydraulic fluid from the hydraulic power source being bypassed into hydraulic reservoir means.

6 Claims, 3 Drawing Figures

HYDRAULIC ROOSTING MEANS

This is a continuation of application Ser. No. 572,390 filed Apr. 28, 1975, now abandoned.

The present invention relates to hydraulic boosting means which may advantageously be used in combination with hydraulically operated vehicle brake means such as brake master cylinder means, although not limited to such a use. More particularly, the present invention pertains to hydraulic boosting means which is particularly suitable for use with hydraulically operated vehicle brake means provided with anti-skid control means.

Conventionally, hydraulic boosting means which is used for this purpose includes a power piston adapted to be operatively connected with an input member of a brake master cylinder. A pressure chamber is defined at one side of the power piston and the power piston is driven under the influence of the hydraulic pressure established in the pressure chamber so as to actuate the input member of the brake master cylinder. The boosting means is provided with a normally opened control valve for allowing hydraulic fluid from a hydraulic power source to flow into a reservoir in an open or inoperative position, and establishing hydraulic pressure in said pressure chamber in an operative position by manually closing or reducing the opening of the control valve through actuation of a manually operated brake actuating member such as a brake actuating pedal of a vehicle.

In conventional boosting means, substantially all of hydraulic fluid supplied by the hydraulic power source is passed through the control valve into the hydraulic reservoir in the inoperative position of the valve, so that the valve is provided with a relatively large opening in order to make the flow resistance as low as possible. Therefore, a relatively large operating stroke is required for the brake actuating member to close or restrict the opening of the control valve. When this type of hydraulic boosting means is applied to a brake system which has anti-skid control means for releasing brake applying effort when wheel skid or wheel lock is sensed by displacing the power piston of the boosting means in the brake release direction, a further disadvantage will be encountered in that there will be produced substantial change in fluid flow through the control valve whenever the wheel skid or wheel lock is sensed, so that the manually operated brake actuating member will be frequently subjected to shock loads.

The present invention has therefore an object to eliminate the aforementioned disadvantages of the conventional hydraulic boosting means.

Another object of the present invention is to provide hydraulic boosting means which requires only a small operating stroke of an input member when it is brought into an operative condition.

A further object of the present invention is to provide hydraulic boosting means in which the input member is substantially free from shock loads when it is used in combination with vehicle brake means having anti-skid control means.

A still further object of the present invention is to provide hydraulic boosting means in which only a limited amount of hydraulic fluid is passed from the hydraulic power source through booster control valve means when the boosting means is in inoperative condition, the remaining portion of the hydraulic fluid from the hydraulic power source being bypassed into hydraulic reservoir means.

In accordance with the present invention, the above and other objects of the present invention can be accomplished by hydraulic boosting means comprising power cylinder means, power piston means slidably received in said power cylinder means and defining pressure chamber means at one side thereof, conduit means for connecting a hydraulic power source with said pressure chamber means, control valve means which includes control piston means slidably disposed in control cylinder means for defining therein first pressure control chamber means at one side and second pressure control chamber means at the other side thereof, said first pressure control chamber means being connected with said pressure chamber means in said power cylinder means, said second control chamber means being connected through variable orifice means with return conduit means leading to hydraulic reservoir means, further orifice means provided in said control piston means for connecting the first and second pressure control chamber means, bypass port means provided in said control cylinder means in such a position that it is adapted to be opened to said first pressure control chamber means when the control piston means is displaced toward said second pressure control chamber means by a predetermined distance, means for resiliently biasing the control piston means toward said first pressure control chamber means, and manually operated means for adjusting the variable orifice means. In the boosting means in accordance with the present invention, the variable orifice means has such an opening that it does not provide any appreciable flow resistance when the manually operated adjusting means is in the inoperative position. Thus, a pressure difference is produced across the control piston due to the existence of the orifice means in the piston so as to displace the control piston until the bypass port is opened to the first control chamber to release the pressure therein and also in the pressure chamber in the power cylinder. The variable orifice is closed or reduced in opening by said manually operated adjusting means when the boosting means is to be operated so as to establish a pressure in the second pressure control chamber. Then, the control piston is returned toward the first control chamber under the influence of the biasing means until the bypass port means is closed. Thus, a pressure is established in the first control chamber and also in the pressure chamber of the power cylinder so as to drive the power piston. The power piston is provided with an output member which may be operatively connected with an input member of a brake master cylinder or the like.

When the boosting means of the present invention is used in combination with vehicle brake means having anti-skid control means, a return chamber may be defined in the power cylinder at the side of the power piston opposite to the pressure chamber and the return chamber is connected on one hand with a hydraulic power source and on the other hand with the reservoir through a normally open solenoid valve. When wheel lock is sensed, an electrical signal is produced to energize the solenoid valve so that the return line to the reservoir is closed. Thus, a hydraulic pressure is established in the return chamber and the power piston is shifted to the inoperative position under the influence of resilient return spring means which may be disposed in the return chamber. In this manner, brake applying effort can be released until wheel lock is eliminated.

The above and other objects and features of the present invention will become apparent from the following descriptions of preferred embodiments taking reference to the accompanying drawings, in which.

Figure 1:
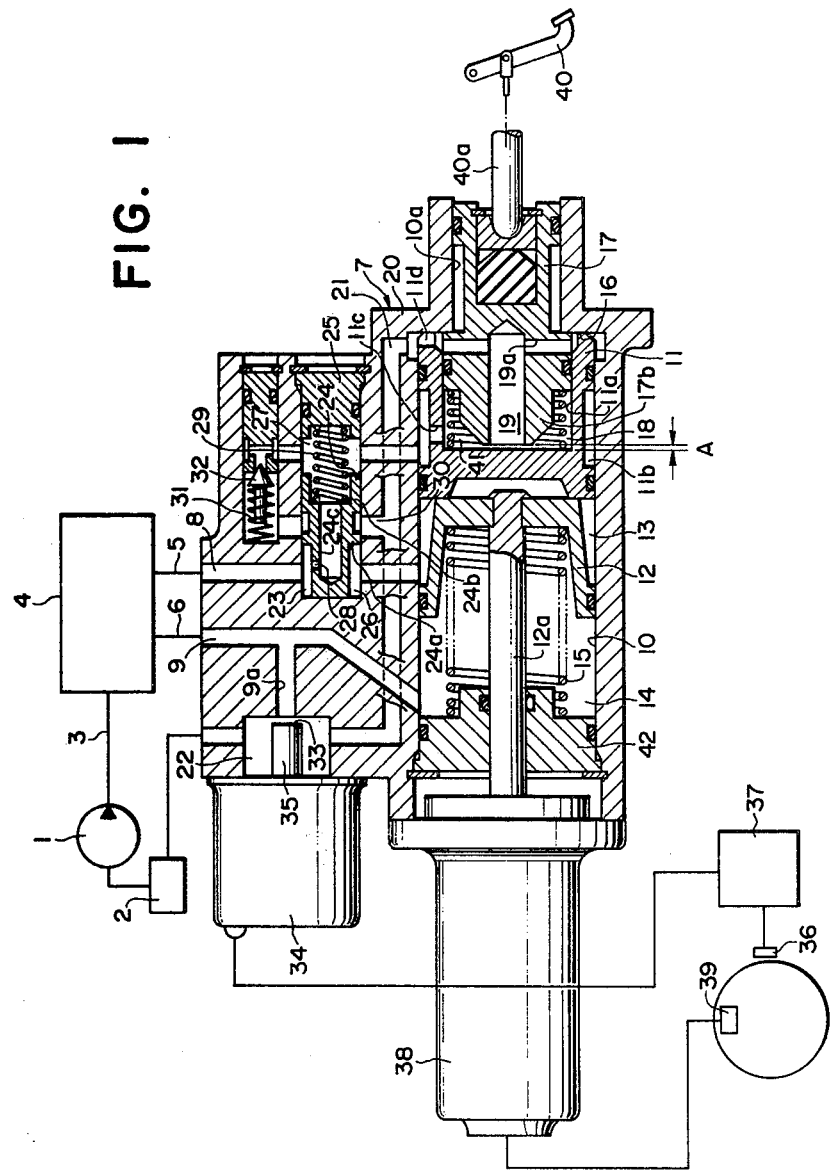
FIG. 1 is a schematic sectional view of a hydraulic boosting device embodying the features of the present invention.

Referring now to the drawings, particularly to FIG. 1, there is shown a hydraulic boosting device 7 which is supplied with pressurized hydraulic fluid from a hydraulic pump 1 through a pressure line 3 and a flow divider valve 4. As is well known in the art, the hydraulic pump 1 draws hydraulic fluid from a reservoir 2 and discharges under pressure into the pressure line 3.

The boosting device 7 includes a housing 20 which is formed with a power cylinder bore 10. A cylinder bore 10a of smaller diameter is co-axially formed so as to define an annular shoulder 16 with the cylinder bore 10. The cylinder bore 10 is closed at the end opposite to the bore 10a by means of an end plate 42. In the cylinder bore 10, there are slidably disposed a valve housing 11 and a power piston 12. A pressure chamber 13 is thus defined in the cylinder bore 10 between the valve housing 11 and the power piston 12, and a return chamber 14 between the power piston 12 and the end plate 42. A compression spring 15 is disposed between the power piston 12 and the end plate 42 so as to urge the power piston 12 and the valve housing 11 toward right until the valve housing 11 abuts the shoulder 16. The valve housing 11 has a cylindrical axial bore 11a opening at the right end thereof. An input piston 17 is slidably received in the bore 10a and has a large diameter portion 17a slidable in the bore 11a of the valve housing 11. Thus, a chamber 18 is defined in the bore 11a between the bottom of the bore 11a and the input piston 17. A manually operated brake pedal 40 is connected through a pushrod 40a with the input piston 17 so that the piston is moved toward left when the brake pedal 40 is depressed.

The valve housing 11 has a circumferential groove 11b on its outer cylindrical surface and the groove 11b is connected through a radial passage 11c with the chamber 18. The input piston 17 is provided at the large diameter portion 17a with a tapered end 17b in which an axial passage 19 opens. The passage 19 is connected with a radial passage 19a which is also formed in the input piston 17 and opens at the outer periphery of the large diameter portion thereof. In the chamber 18, there is disposed a compression spring 41 which acts between the bottom of the bore 11a and the input piston 17 so as to urge the latter toward right.

A second cylindrical bore 23 is formed in the housing 20 in parallel with the bore 10. The bore 23 has one open end which is closed by a closure plug member 25. In the bore 23, there is slidably received a spool 24 which has a pair of axially spaced lands 24a and 24b. Thus, a chamber 26 is defined in the bore 23 at the left side of the land 24a and a further chamber 27 is defined between the spool 24 and the plug member 25. A spring 29 is disposed in the chamber 27 so as to bias the spool 24 toward left. The spool 24 is provided with an axial bore 24c opening at one end to the chamber 27 and connected through an orifice 28 with the chamber 26.

The housing 20 is formed with a passage 8 which leads to the chambers 26 and 13 and also with a passage 9 which leads to the chamber 14. The flow divider valve 4 supplies pressurized hydraulic fluid from the pump 1 through supply lines 5 and 6 to the passages 8 and 9 at a predetermined rate. A return line 21 is also provided in the housing 20 so as to connect the reservoir 2 through a chamber 22 with the bore 10 at the end adjacent to the shoulder 16.

The chamber 27 is connected with the bore 10 at the groove 11b in the valve housing 11, and the valve housing 11 is formed with a groove 11d at the end facing to the shoulder 16 so that the radial passage 19a in the input piston 17 is always in communication with the return line 21. The bore 23 is connected with the return line 21 through a passage 30 which opens to the bore 23 at such a location that it is closed by the spool 24 when it is in the left position as shown in the drawing but opened when it is displaced toward right against the action of the spring 29. The chamber 27 is connected through a check valve including a valve member 32 and a spring 31 with the passage 30.

The passage 9 is connected through a branch passage 9a with the chamber 22, and a solenoid device 34 is disposed adjacent to the chamber 22 in such a manner that its plunger 35 closes the branch passage 9a when the solenoid is energized. The power piston 12 has a piston rod 12a which extends through the plate 42 and operatively connected with a brake master cylinder 38 of known construction. The master cylinder 38 is operatively connected in a known manner with a wheel brake device. The brake system also includes a wheel lock sensor 36 and a control device 37 which produces electrical control signal when wheel lock is detected.

In operation, the hydraulic pump 1 is continuously driven by a suitable power source and supplies hydraulic fluid under pressure through the line 3 into the flow divider valve 4. The valve 4 functions to share the supply of hydraulic fluid to the lines 5 and 6 at a predetermined ratio. Thus, a predetermined amount of hydraulic fluid is supplied through the line 6 into the passage 9. Since the solenoid device 34 is in the de-energized condition at this instance, the hydraulic fluid supplied to the passage 9 is allowed to flow through the branch passage 9a and the chamber 22 into the reservoir 2. Therefore, pressure is not built up in the chamber 14.

The hydraulic fluid supplied into the passage 8 is introduced into the chamber 26 from where it is allowed through the orifice 28 into the chamber 27. Then, the hydraulic fluid is further passed through the groove 11b, the passage 11c, the chamber 18, the space A between the tapered end of the input piston 17 and the bottom of the bore 11a in the valve housing 11, the passage 19 and 19a and the groove 11d into the return line 21 to be returned to the reservoir 2. When the brake pedal 40 is released, the space A is sufficiently large to allow unrestricted flow of hydraulic fluid so that pressure is not built up in the chamber 27. Therefore, pressure difference is produced between the chambers 26 and 27 across the orifice 28, and the spool 24 is shifted toward right against the action of the spring 29 until the passage 30 is opened to the chamber 26. Thus, the fluid in the chamber 26 is allowed to flow through the passage 30 into the return line 21 to be returned to the reservoir 2. Therefore, pressure does not build up in the pressure chamber 13 to an adequate level to overcome the biasing force of the spring 15.

When the brake pedal 40 is depressed, the input piston 17 is shifted toward left to close or restrict the space A whereby the fluid flow through the space A is restricted and pressure is built up in the chamber 27. Thus, the spool 24 is displaced toward left under the influence of the spring 29 to the position shown in FIG. 1 so that the passage 30 is separated from the chamber 26 and pressurized fluid from the pump 1 is introduced into the pressure chamber 13. Therefore, the power piston 12 is moved toward left under the action of the pressure in the chamber 13 to actuate the brake master cylinder 38. In this manner, the brake device 39 is actuated.

The pressure built up in the chamber 18 is substantially proportional to the pressure in the chamber 13, so that the brake pedal 40 is subjected to a reaction force which is considered as being proportional to the brake applying effort. When the pressure in the chamber 27 exceeds an allowable limit, it is released through the check valve 32.

During application of the brake, when the wheel is locked, it is sensed by the lock sensor 36 and electrical signal is transmitted from the control device to the solenoid device 34. Therefore, the solenoid plunger 35 is shifted toward the right to close the branch passage 9a. Thus, pressurized fluid supplied to the passage 9 is introduced into the chamber 14. The power piston 12 is then moved toward right under the influence of the spring 15 to return the master cylinder 38 to the inoperative position so as to release the brake until the wheel lock is eliminated and the electrical signal from the control device 37 is terminated.

When the supply of pressurized fluid from the pump 1 is not obtainable for some possible reasons, such as failure of the pump or the like, pressure is not built up in the pressure chamber 13 even when the space A is completely closed. Then, the operator may further depress the brake pedal 40 after the tapered end 17b of the input piston 17 has abutted the bottom wall of the bore 11a in the valve housing 11, whereby the movement of the input piston 17 is transmitted through the valve housing 11 to the power piston 12 to actuate the latter manually.

Figure 2:
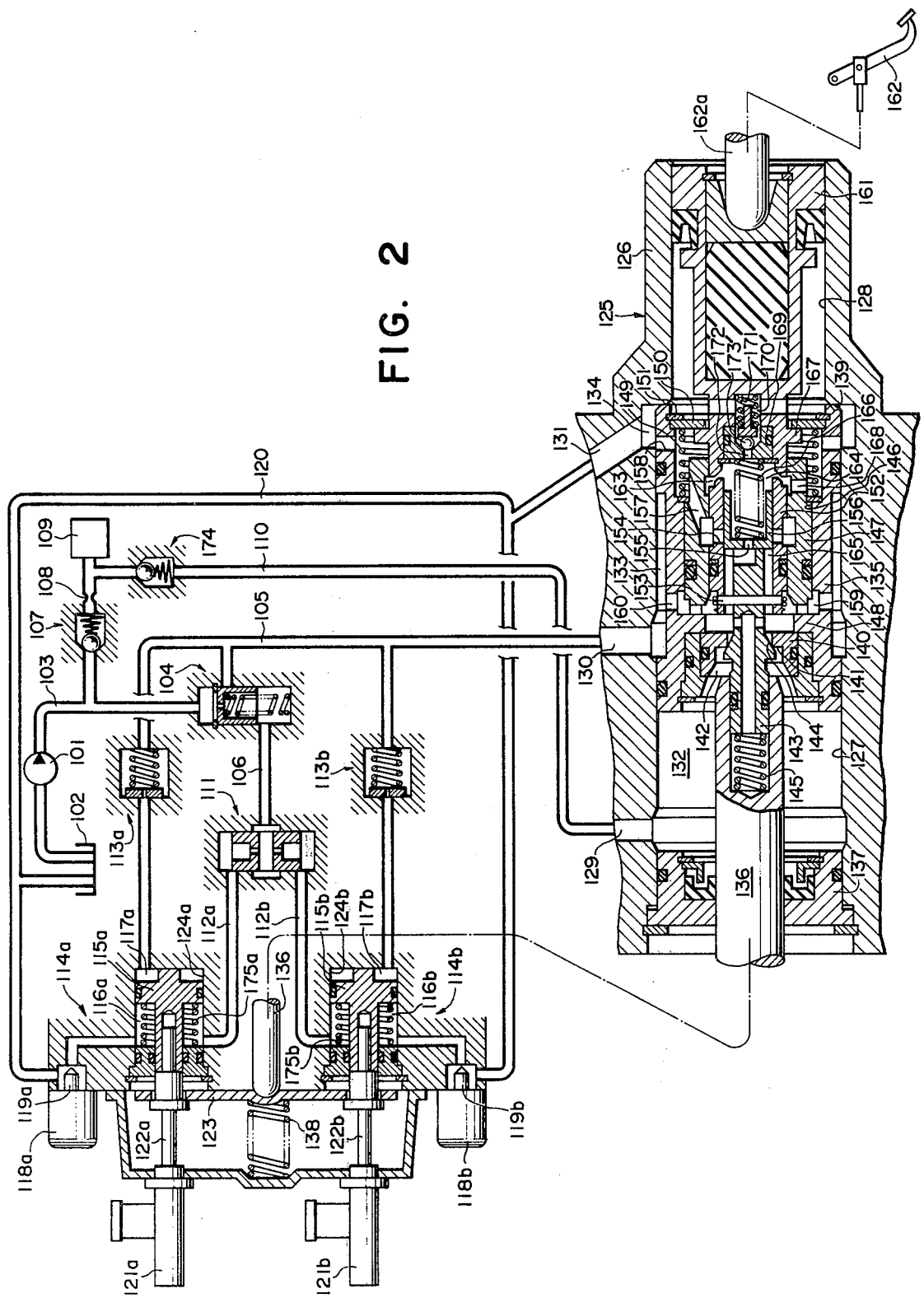
FIG. 2 is a view similar to FIG. 1 but showing another embodiment of the present invention.

Referring now to FIG. 2, there is shown another example of brake system including a boosting device in accordance with the present invention. The brake system includes a hydraulic pump 101 which draws hydraulic fluid from a reservoir 102 and supplies it under pressure to pressure line 103. The pressure line 103 is connected with a flow divider valve 104 which shares supply of pressurized hydraulic fluid into lines 105 and 106 at a predetermined ratio. The line 106 is connected through a second flow divider valve 11 with lines 112a and 112b.

In this embodiment, there are provided a pair of boosting devices 114a and 114b which are of the same construction. The first boosting device 114a includes a cylinder bore 124a in which a power piston 115a is slidably received. The power piston 115a defines a return chamber 116a and a pressure chamber 117a at the opposite sides thereof. A coil spring 175a is disposed in the return chamber 116a so as to resiliently bias the power piston 115a toward the pressure chamber 117a. The power piston 115a has a piston rod 122a which is operatively connected with a brake master cylinder 121a. The line 112a from the flow divider valve 111 is connected with the chamber 116a which is in turn connected through a chamber 119a with a return line 120 leading to the reservoir 102. The chamber 119a is provided with a solenoid device 118a which controls the return flow from the chamber 116a to the reservoir 102 as in the previous embodiment. The line 105 is connected through a one-way flow restricting valve 113a with the pressure chamber 117a.

The boosting device 114b is constructed in the same way as the boosting device 114a so that it will not be described in detail. The piston rods 122a and 122b of the boosting devices 114a and 114b are connected together by means of a connecting lever 123 which is resiliently biased toward right by a spring 138. The pressure line 103 is connected through a check valve 107 and a restriction 108 with a pressure accumulator 109.

The boosting devices 114a and 114b are also combined with a flow control valve 125 which includes an axially aligned bores 127 and 128 of different diameters. An annular shoulder 139 is formed at the junction of the bores 127 and 128. The bore 127 is closed at an end opposite to the bore 128 by an end closure member 137. A floating piston 135 is slidably disposed in the bore 127 and defines a chamber 132 between the end closure member 137 and the piston 135. The piston 135 has a circumferential groove 133 at its outer surface and an axial bore 146 which opens at the end facing to the bore 128 and is formed with an annular shoulder 148 at the opposite end.

The chamber 132 is connected through a line 110 including a check valve 174 and through a port 129 with the accumulator 109, and the groove 133 is connected through a port 130 with the line 105. The bore 127 is formed with an annular groove 134 which is located adjacent to the shoulder 139 and connected through a port 131 with the return line 120.

The piston 135 has a piston rod 136 secured thereto. The piston rod 136 extends through the end closure member 137 and is operatively connected with the connecting lever 123. Thus, it will be seen that the spring 138 urges the piston 135 through the lever 123 and the piston rod 136 to a position in which it abuts the shoulder 139.

Between the piston 135 and the piston rod 136, there is disposed a valve seat 140 having a seat surface 141 and a co-operating valve member 143 is slidably received in an axial bore formed in the piston rod 136. The valve member 143 has a conical valve surface 144 for co-operation with the valve seat surface 141 and is resiliently urged by means of a spring 145 in the closing direction.

A slidable member 147 is received in the bore 146 and defines a chamber 159 at the left side thereof. The chamber 159 is connected through a passage 160 formed in the piston 135 with the groove 133 and also through the valve seat 140 and a passage 142 with the chamber 132. The slidable member 147 is biased toward left by means of a spring 149 disposed between the slidable member 147 and an end plate 150 which is held at the open end of the bore 146 by a retaining ring 151. The slidable member 147 has an axial bore extending therethrough and a hollow sleeve member 152 is slidably received in the bore.

The sleeve member 152 is connected at one end with the valve member 143 by means of a pin 153. The sleeve member 152 has an axial bore extending therethrough, and a valve member 156 forming the control piston, is slidably received in the bore. The valve member 156 defines a chamber 164 at the right side thereof and is formed with an orifice 155 which connects the chamber 164 with the chamber 159. The sleeve member 152 is formed at its intermediate portion with radial passages 154 which communicate through a passage 157 formed in the slidable member 147 and through a passage 158 formed in the piston 135 with the annular groove 134.

An input piston 161 is slidably disposed in the bore 128 and connected through a push-pull rod 162a with a brake actuating pedal 162. The input piston 161 is extended inwardly into the bore of the slidable member 147 and co-operates with the adjacent end of the sleeve member 152 to form a variable orifice 163 therebetween. Thus, the chamber 164 is connected through the variable orifice 163, a passage 168 formed in the slidable member 147 and the passage 158 with the annular groove 134.

The input piston 161 has a valve seat member 169 which is secured thereto at its left end. The seat member 169 has a central bore 172 which is connected through a chamber 170 and a passage 173 formed in the input piston 161 with the passage 158 leading to the annular groove 134. A ball member 173 is disposed in the chamber 170 and forced to close the bore 172 in the valve seat member 169 by means of a spring 171. Thus, the chamber 164 is connected through the check valve mechanism with the annular groove 134 which in turn connected through the port 131 with the return line 120. A spring 166 is disposed in the chamber 164 so as to act between the valve seat member 169 and the valve member 156 to force the latter leftwardly.

In operation, the hydraulic pump 101 is continuously operated to draw hydraulic fluid from the reservoir 102 and discharges under pressure to the pressure line 103. The flow divider valve 104 divides the pressurized fluid from the line 103 into the lines 105 and 106 in accordance with a predetermined ratio. The fluid supplied to the line 106 is again divided by the flow divider valve 111 into the lines 112a and 112b. The fluid in the lines 112a and 112b is allowed to flow freely through the chambers 116a and 116b, the chambers 119a and 119b and the return line 120 into the reservoir 102. Thus, pressure does not build up in the chambers 116a and 116b.

Pressurized fluid in the line 103 is also passed through the check valve 107 and the restriction 108 and introduced into the accumulator 109. Further, the pressurized fluid is introduced through the check valve 174, the line 110 and the port 129 into the chamber 132.

The fluid in the line 105 flows through the port 130, the groove 133 and the passage 160 into the chamber 159 from where it is further passed through the orifice 155 in the valve member 156 into the chamber 164. When the brake pedal 162 is released, the variable orifice 163 has an adequate area to allow free flow of the fluid so that the fluid in the chamber 164 is allowed to flow through the orifice 163, the passages 168 and 158, the annular groove 134 and the port 131 into the return line 120. Thus, pressure does not build up in the chamber 164 and pressure difference is established between the chambers 159 and 164 across the orifice 155 so that the valve member 156 is displaced toward right to open the passage 154 into the chamber 159. Thus, the pressurized fluid in the chamber 159 is allowed to flow through the passages 154, 157 and 158 into the annular groove 134. Therefore, pressure in the line 105 is released and pressure is not applied to the chambers 117a and 117b.

When the brake pedal 162 is depressed, the variable orifice 163 is closed or restricted so that pressure is built up in the chamber 164 to an adequate value to return the valve member 156 under the influence of the spring 166. Thus, the passage 154 is closed and pressure is built up in the chamber 159 and also in the line 105. The pressure in the line 105 is transmitted through the valves 113a and 113b into the pressure chambers 117a and 117b. Thus, the power pistons 115a and 115b are displaced toward left against the action of the springs 116a and 116b, respectively, so as to actuate the master cylinders 121a and 121b.

When wheel lock is sensed during application of the brake, either or both of the solenoid devices 118a and 118b are energized so that the plungers of the solenoid devices 118a and 118b close the lines from the chambers 116a and 116b to the chambers 119a and 119b. Thus, pressure is established in the return chambers 116a and 116b and the power pistons 115a and 115b are returned toward right under the influence of the springs 116a and 116b to release the brake until wheel lock is eliminated.

When pump 101 fails, pressurized fluid is not supplied to the line 103 and therefore to the lines 105 and 106. In this instance, pressure does not build up in the chamber 159 even when the orifice 163 is closed through actuation of brake pedal 162. When the brake pedal 162 is further depressed after the inner end of the input piston 161 has engaged the adjacent end of the sleeve member 152, the member 152 is moved toward left together with the valve member 143 so that the valve surface 144 on the valve member 143 is moved apart from the valve seat surface 141 of the seat member 140. Thus, pressurized fluid in the chamber 132 and also in the accumulator 109 is allowed to flow into the chamber 159 and then through the passage 160, the groove 133, the port 130, the line 105 and the valves 113a and 113b into the pressure chambers 117a and 117b with the result that the power pistons 115a and 115b are shifted toward left to actuate the brake master cylinders 121a and 121b.

After the pressure in the accumulator 109 is exhausted, the brake master cylinders 121a and 121b can be manually actuated by displacing the piston 135 toward left through a further actuation of the brake pedal 162.

Figure 3:
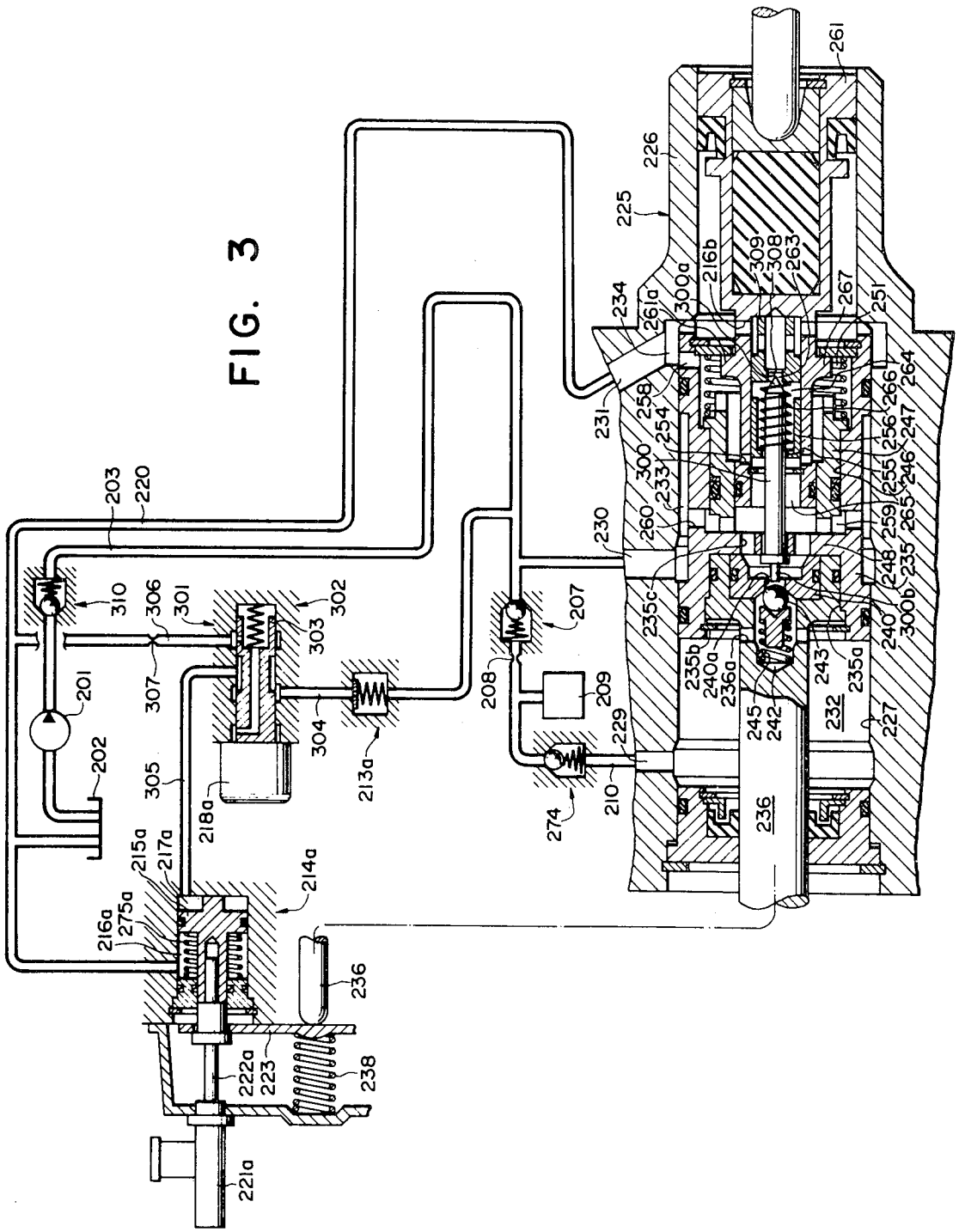
FIG. 3 is a schematic sectional view showing a further embodiment of the present invention.

In the embodiment shown in FIG. 3, the booster device 214a is similar in construction to that in the embodiment shown in FIG. 2 but has a return chamber 216a which is always in communication with a return line 220 leading to a hydraulic fluid reservoir 202. The device 214a also has a pressure chamber 217a which is connected through a line 305, a solenoid valve 302, a line 304 and a one-way restriction valve 213a with a pressure line 203 which is connected through a check valve 310 with a hydraulic pump 201.

The solenoid valve 301 includes an electric solenoid 218a which is adapted to actuate a spool valve member 303 axially slidably disposed in the bore formed in the housing 302. The solenoid valve 301 is so constructed that the line 304 is connected with the line 305 when the solenoid 218a is deenergized but the line 305 is opened through a line 306 having a restriction 307 to the return line 220 when the solenoid 218a is energized.

As in the embodiment of FIG. 2, the embodiment of FIG. 3 is also provided with a control valve 225 which includes a housing 226 having axially aligned cylindrical bores 227 and 228 of different diameters. A piston 235 is slidably disposed in the bore 227 to define a chamber 232 at the side opposite to the bore 228. The piston 235 has a recess 235a in the end surface facing to the chamber 232 and a piston rod 236 is received at one end in the recess 235a and held in the position by a retaining ring 235b. As in the previous embodiment, the piston rod 236 extends outwardly and engages the connecting lever 223 which corresponds to the lever 123 in the previous embodiment.

The piston 235 has an axial bore 246 opening at the end facing to the bore 228 of smaller diameter and being connected at the other end with the recess 235a through a hole 235c. An inwardly directed annular flange 248 is formed between the bore 246 and the recess 235a. A slidable member 247 is received in the bore 246 for axial sliding movement therein and has an axial bore which extends therethrough. In the bore 228, there is disposed an input piston 261 and has a leftward extended portion 261a which is slidably received in the bore of the slidable member 247. The extended portion 261a of the input piston 261 also has an axial bore which is connected at its right end through a passage 261b with the chamber 234 and receives a valve member 256 for axial sliding movement. Thus, the slidable member 247, the extended portion 261a of the input piston 261 and the valve member 256 defines a chamber 259 at the left side thereof.

The piston 235 is formed at the outer surface with circumferential groove 233 which is connected on one hand through a radial passage 260 with the chamber 259 and on the other hand through a port 230 with the pressure line 203. Between the piston 235 and the piston rod 236, there is disposed a valve seat member 240 which has a central opening 240a leading on one hand through a valve chamber 242 and a passage 236a to the chamber 232 and on the other hand through the hole 235c with the chamber 259. A ball member 243 which is resiliently biased against the valve seat member 240 by means of the spring 245 serves to normally close the opening 240a in the valve seat member 240.

The portion 261a of the input piston 261 is formed with a passage 254 which connects the chamber 259 through a passage 258 formed in the piston 235 with the chamber 234. A seat member 309 is located at the right end of the axial bore in the input piston 261 and a spring 266 is disposed between the seat member 309 and the valve member 256 so as to bias the latter toward left to a position in which the passage 254 is closed by the valve member 256.

The valve member 256 is formed with an axially directed central hole through which a valve rod 300 extends in such a manner that an orifice 255 is formed between the valve member 256 and the valve rod 300. The seat member is formed with a passage 308 for connecting the chamber 259 through the orifice 255 with the passage 261b leading to the chamber 234. The valve rod 300 has a tapered or conical end 300a for co-operation with the passage 308 of the seat member 309 to define a variable orifice 263. The valve rod 300 also has at the opposite end a pin portion 300b which serves to force the ball member 243 apart from the valve seat member 240 when it is shifted toward left.

The operation of the embodiment is basically the same as that in the embodiment shown in FIG. 2. When the pump 201 is driven, it continuously draws hydraulic fluid from the reservoir 202 and discharges under pressure to the pressure line 203. The pressurized fluid in the line 203 is then passed through the port 230, the groove 233 and the passage 260 into the chamber 259. The fluid is then passed through the orifice 255, the passages 308 and 216b to the chamber 234 which is connected through the port 231 with the return line 220. When the brake pedal is released, the input piston 261 is rightwardly shifted and there is an adequate area in the orifice 263 to allow free flow of the fluid. Therefore, a pressure difference is established across the orifice 255 and the valve member 256 is shifted toward right against the action of the spring 266 until the passage 254 is opened to the chamber 259. Thus, the fluid in the chamber 259 is allowed to flow through the passages 254 and 258 to the chamber 234 and therefore the pressure in the chamber 259 and also in the line 203 is decreased. The pressure in the line 203 is transmitted through the valve 213a and the solenoid valve 301 to the pressure chamber 217a but the pressure in this instance is not sufficient to displace the power piston 215a toward left against the influence of the spring 275a.

When the input piston 261 is shifted toward left through actuation of the brake pedal, the orifice 263 is closed or restricted so that pressure is established in the chamber 264 to a sufficient level to displace the valve member 256 toward left with the assistance of the spring 266. Thus, the passage 254 is closed and therefore pressure is built up in the chamber 259 and also in the line 203. The pressure in the line 203 is transmitted to the pressure chamber 217a whereby the power piston 215a is driven toward left to actuate the brake master cylinder 221a. If wheel lock is sensed when the brake is applied on a slippy road, the solenoid valve 301 is energized and the pressure in the chamber 217a is released to the return line 220.

When the pump 201 fails, pressure does not build up even when the orifice 263 is closed through actuation of the input piston 261. Then, the operator may shift the input piston 261 further leftward until the valve rod member 300 is moved toward left. Thus, the pin portion 300b of the valve rod 300 engages the ball 243 to displace it from the valve seat member 240. In this manner, the hole 240a is opened and pressurized fluid in the chamber 232 and also in the accumulator 209 is allowed to flow into the chamber 259 from where the fluid is further passed through the passage 260, the groove 233 and the port 230 into the pressure line 203. The pressure in the line 203 is transmitted through the valve 213a and the solenoid valve 301 into the pressure chamber 217a to drive the power piston 215a toward left.

When the pressure in the accumulator 209 is exhausted, the brake master cylinder 221a can be manually actuated by moving the input piston 261 further toward left after the left end of the piston 261 has engaged the annular flange 248 of the piston 235 so as to drive the latter toward left.

The invention has thus been shown and described with reference to specific embodiments, however, it should be noted that the invention is in no way limited to the details of the illustrated embodiments but changed and modifications may be made without departing from the scope of the appended claims.

I claim:

1. Hydraulic brake boosting means for a braking system having brake pedal means, a hydraulic power source, hydraulic reservoir means, wheel brake means and brake master cylinder means for actuating the wheel brake means, said hydraulic brake boosting means comprising:
   a. power cylinder means;
   b. power piston means slidably received in said power cylinder means and selectively cooperation with said brake master cylinder means for supplying hydraulic pressure to said wheel brake means;
   c. power pressure chamber means defined at one side of said power piston means in said power cylinder means;

d. supply conduit means for hydraulically connecting the hydraulic power source with said power pressure chamber means;
e. return conduit means hydraulically connected to the hydraulic reservoir means;
f. variable orifice means hydraulically connected to said return conduit means;
g. control valve means having
   (i) control cylinder means;
   (ii) control piston means slidably disposed in said control cylinder means for defining at one side therein a first control pressure chamber means opening into said supply conduit means and a second control pressure chamber means at the other side hydraulically and continuously connected to said variable orifice means;
   (iii) channel means formed in said control piston means and having an orifice with access to said supply conduit means for diverting a portion of the hydraulic pressure from said hydraulic power source and for connecting, and establishing a pressure differential between said first and second control pressure chamber means;
   (iv) by-pass port means provided in said control cylinder means and in direct fluid communication with said return conduit means at all times, wherein said by-pass port means is open to said first control pressure chamber means when said control piston means is displaced toward said second control pressure chamber means by a predetermined distance and wherein said by-pass port means is closed to said first control pressure chamber means when said control piston means is displaced toward said first control pressure chamber means; and
   (v) means for resiliently biasing said control piston means toward said first control pressure chamber means;
h. manually operated means, including input piston means operatively connected to said brake pedal means for controlling the opening of said variable orifice means; and
i. means disposed between said second control pressure chamber means and said variable orifice means for applying the pressure developed in said second control pressure chamber means as a braking reaction force to said input piston means.

2. Hydraulic brake boosting means in accordance with claim 1 further comprising:
a. pressure accumulator means;
b. bore means;
c. floating piston means slidably disposed in said bore means and having an opening for receiving said control piston means;
d. pressure accumulating chamber means defined at one side of said floating piston means in said bore means and connected to said pressure accumulator means; and
e. valve means in said floating piston means for connecting said pressure accumulating chamber means with said first control pressure chamber means when the latter valve means is opened; and wherein said manually operated means opens said latter valve means when said manually operated means is further operated after closing said variable orifice means.

3. Hydraulic brake boosting means in accordance with claim 1 further comprising:
a. return chamber means defined in said power cylinder means at the side of said power piston means opposite to said power pressure chamber means and connected to said hydraulic power source and said hydraulic reservoir means;
b. means for resiliently biasing said power piston means toward said power pressure chamber means; and
c. valve means disposed between said return chamber means and said hydraulic reservoir means for selectively closing said return chamber means from said hydraulic reservoir means and establishing hydraulic pressure therein, wherein the established hydraulic pressure in said return chamber means and the biasing action of said means for biasing said power piston means exceed the hydraulic pressure in said power chamber means to move said power piston means toward said power pressure chamber means.

4. Hydraulic brake boosting means in accordance with claim 3 wherein said valve means for selectively closing said return chamber means from said hydraulic reservoir means comprises solenoid valve means actuated for closing when wheel lock is sensed.

5. Hydraulic brake boosting means in accordance with claim 2 wherein said input piston means has a portion constituting a part of said variable orifice means.

6. Hydraulic brake boosting means in accordance with claim 2 wherein said manually operated means actuates manually said brake master cylinder means when said manually operated means is further operated after opening said valve means in said floating piston means.

* * * * *

UNITED STATES PATENT AND TRADEMARK OFFICE
CERTIFICATE OF CORRECTION

PATENT NO. : 4,123,117
DATED : Oct. 31, 1978
INVENTOR(S) : Yoshiharu Adachi

It is certified that error appears in the above–identified patent and that said Letters Patent are hereby corrected as shown below:

In the title on the first page, please delete "ROOSTING" and insert --BOOSTING--.

Signed and Sealed this

Twenty-ninth Day of May 1979

[SEAL]

Attest:

RUTH C. MASON
Attesting Officer

DONALD W. BANNER
Commissioner of Patents and Trademarks